US010705187B1

(12) United States Patent
Hebert

(10) Patent No.: US 10,705,187 B1
(45) Date of Patent: Jul. 7, 2020

(54) AERIAL DRONE FOR RADAR CALIBRATION

(71) Applicant: James L. Hebert, Waldorf, MD (US)

(72) Inventor: James L. Hebert, Waldorf, MD (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 221 days.

(21) Appl. No.: 15/598,352

(22) Filed: May 18, 2017

(51) Int. Cl.
*G01S 7/41* (2006.01)
*F41J 9/08* (2006.01)
*H04B 1/06* (2006.01)
*H04B 1/02* (2006.01)

(52) U.S. Cl.
CPC ............ *G01S 7/411* (2013.01); *F41J 9/08* (2013.01); *H04B 1/02* (2013.01); *H04B 1/06* (2013.01); *G01S 7/414* (2013.01)

(58) Field of Classification Search
CPC . G01S 7/411; G01S 7/412; G01S 7/414; F41J 9/08; H04B 1/02; H04B 1/06
USPC ........................................................ 342/165
See application file for complete search history.

(56) References Cited

U.S. PATENT DOCUMENTS

| | | | | |
|---|---|---|---|---|
| 3,334,345 A | 8/1967 | Bradford | | 343/18 |
| 4,613,863 A * | 9/1986 | Mitchell | | G01S 7/38 342/14 |
| 4,983,021 A * | 1/1991 | Fergason | | G01S 17/026 349/1 |
| 5,075,681 A | 12/1991 | Kartiala | | 342/165 |
| 5,083,128 A * | 1/1992 | Tsuji | | H01Q 17/00 342/12 |
| 5,398,032 A | 3/1995 | Tucker et al. | | 342/9 |
| 6,927,725 B2 | 8/2005 | Wittenberg et al. | | 342/174 |
| 7,218,273 B1 | 5/2007 | Webster, Jr. et al. | | 342/174 |
| 7,852,260 B2 | 12/2010 | Sarafian | | 342/169 |
| 7,948,425 B2 | 5/2011 | Bernhardt et al. | | 342/5 |
| 8,378,881 B2 | 2/2013 | LeMire et al. | | 342/63 |
| 9,387,930 B2 | 7/2016 | Domwald et al. | | B64D 7/06 |
| 2007/0263748 A1 * | 11/2007 | Mesecher | | H01Q 1/282 375/299 |
| 2008/0018525 A1 * | 1/2008 | Svy | | G01S 7/024 342/169 |
| 2012/0105274 A1 | 5/2012 | Andersson et al. | | 342/25 |

(Continued)

FOREIGN PATENT DOCUMENTS

EP 2749892 7/2014 ............ G01R 29/10

*Primary Examiner* — Peter M Bythrow
*Assistant Examiner* — Michael W Justice
(74) *Attorney, Agent, or Firm* — Gerhard W. Thielman

(57) ABSTRACT

An aerial drone or unmanned aerial vehicle (UAV) is provided for radar calibration testing. The drone includes an airframe including a fuselage with nose and tail, wings and elevators. The drone includes at least one antenna attached to the airframe, as well as a signal adapter coupled to the antenna to receive impinging radar signals and transmit an electromagnetic (EM) field that effectively cancels or combines with the scattered field of the drone, depending upon the adapter's mode of operation. In the first mode of operation, the adapter transmits an EM field that has an opposite phase to the drone's scattered field thereby reducing the radar cross-section of the drone. In the second mode, the adapter transmits an EM field that is in-phase with the scattered field thereby increasing the radar cross-section of the drone.

11 Claims, 9 Drawing Sheets

(56) References Cited

U.S. PATENT DOCUMENTS

| | | | |
|---|---|---|---|
| 2014/0332620 A1* | 11/2014 | Earon | B64C 39/024 244/13 |
| 2015/0153740 A1* | 6/2015 | Ben-Shachar | G05D 1/0676 701/16 |
| 2015/0375862 A1* | 12/2015 | Dornwald | B64D 7/00 244/36 |

* cited by examiner

AERIAL DRONE FOR RADAR CALIBRATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to an unmanned aerial vehicle (UAV) for in-flight calibration of remote radar systems. In particular, the invention relates to UAVs having azimuth and elevation profiles that present defined radar reflection signatures.

Land-based and shipborne radar systems must be tested, evaluated and calibrated prior to becoming operational in the field or aboard a ship. Due to ongoing military operations or exercises either on land or at sea, it is critical that new, modified or retrofitted radar systems be promptly and efficiently tested, evaluated and calibrated so that any necessary adjustments can be made and the radar system delivered to military units and bases or installed on ships in a timely manner. Installing radar systems on ships in a timely manner is even more critical because typically, time in port is limited for repairs, maintenance and retrofit assignments. Once these tasks are complete, the ship promptly leaves port to join the rest of the fleet on patrol.

One conventional technique for testing or calibrating radar systems entails flying a manned aircraft around or near the radar installation. However, manned aircraft must be scheduled in advance. Furthermore, due to aircraft availability and weather conditions, days or even weeks could elapse before an aircraft is available for the calibration procedure. Impromptu aircraft flying through the area might be used to calibrate the radar system if the flight path and time of arrival of the aircraft are known in advance by radar personnel.

However, reliance on manned aircraft for calibrating or testing radar systems is time consuming and inefficient, not to mention costly in terms of fuel consumption during transit and test times. Additionally, using manned aircraft to calibrate radar systems typically means the aircraft has been diverted from other important duties.

SUMMARY

Conventional radar test configurations yield disadvantages addressed by various exemplary embodiments of the present invention. In particular, various exemplary embodiments provide an aerial drone that serves as a radar calibration platform using signal reflectors and absorbers. The drone includes a radar cross-section (RCS) adapter coupled to the antenna to receive the emission signal from the radar. The adapter transmits a return signal having one of an amplification return signal that increases the RCS and an attenuation signal that decreases the RCS.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
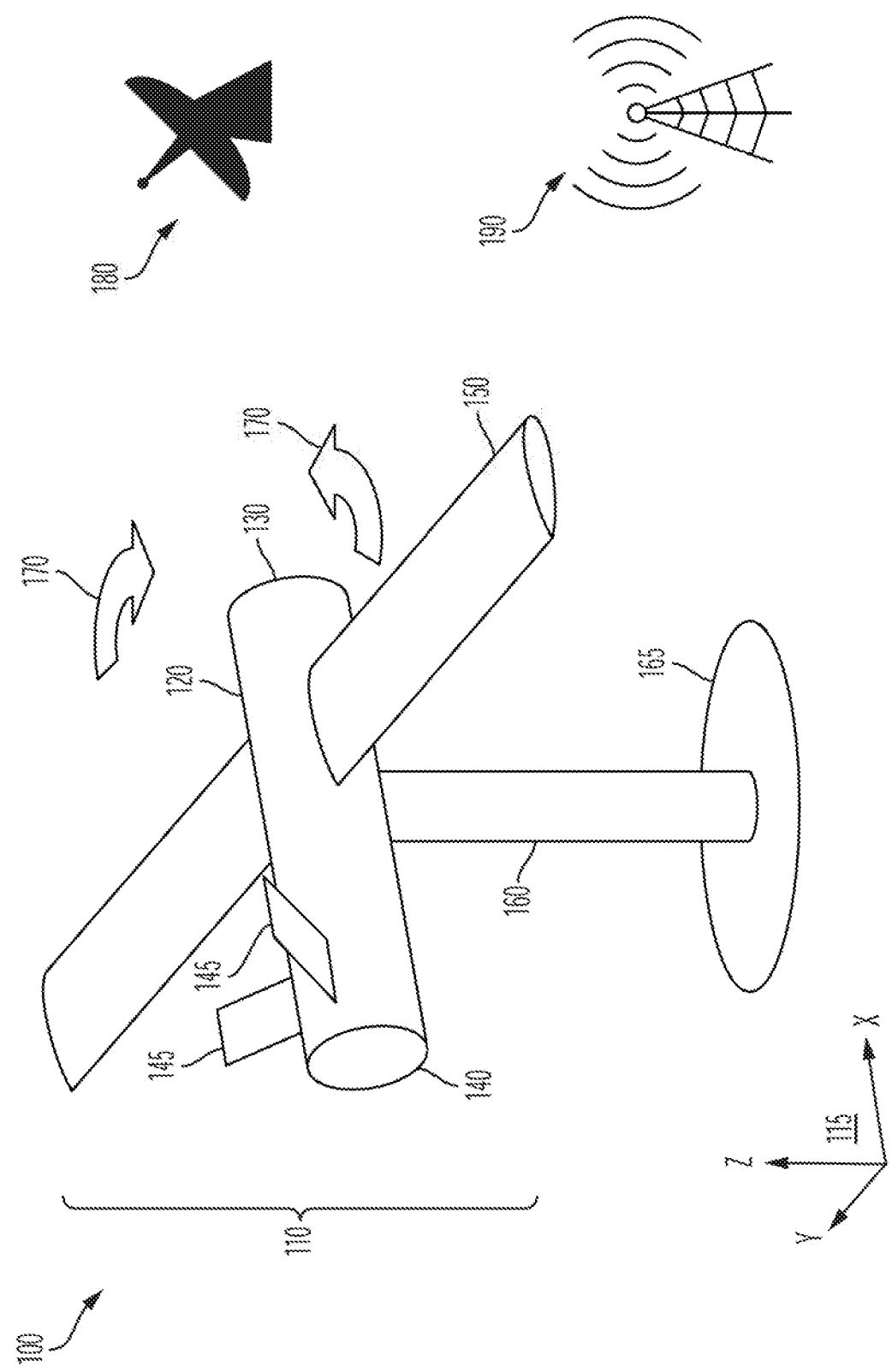
FIG. 1 is a perspective view of an exemplary aerial drone on a pedestal.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments provide an efficient, inexpensive, accurate and reliable platform to calibrate, test and evaluate radar systems. The platform embodiments incorporate an exemplary unmanned aerial vehicle (UAV) or aerial drone to mitigate problems associated with the conventional techniques. The exemplary drone, being much smaller and thereby less expensive to fuel and operate than a manned aircraft, includes an airframe having a fuselage with wings and tail, together with at least one antenna attached to the airframe. The exemplary drone includes an active system coupled to the antenna so as to receive impinging radar signals and transmit an electromagnetic (EM) field that effectively either attenuates or else augments the scattered field of the exemplary drone, depending upon the active system's mode of operation.

In one mode of operation, the active system transmits an EM field with a phase that is opposite to the phase of the scattered field of the exemplary drone, thereby effectively cancelling the scattered field and reducing the drone's radar cross-section (RCS). In another mode of operation, the active system outputs an EM field that is in-phase and combines with the exemplary drone's scattered field thereby enhances its RCS. Other exemplary embodiments provide an exemplary drone that including an airframe having sides that exhibit distinct RCS profiles, such as by equidistantly spaced antennas attached to the airframe and an active system having multiple operational modes coupled to the plurality of equidistantly spaced antennas in order to receive radar signals.

In a first mode of operation, the active system transmits an EM field having a phase opposite to the phase of the scattered field caused by the impinging radar signals so as to cancel the scattered field of the exemplary drone. In a second mode of operation, the active system transmits an electromagnetic field that is in-phase with the scattered field of the exemplary drone so as to combine with and enhance the scattered field. In a third mode of operation, the active system does not transmit any electromagnetic field. The exemplary drone includes at least one passive corner reflector that may be attached to the second side of the airframe to reflect incident radar signals impinging upon the exemplary drone thereby passively enhancing the drone's radar cross-section.

FIG. 1 shows a perspective view 100 of an exemplary UAV or aerial drone 110 configured for static test purposes. A compass rose 115 in relation to the drone 110 identifies Cartesian directions: longitudinal X axis (forward), lateral Y axis (port) and elevation Z axis (upward). The axes also define rotation modes of the drone 110: X for roll, Y for pitch and Z for yaw. The drone 110 includes an airframe fuselage 120 extending between a nose 130 and tail 140. V-tail elevators 145 attach to the fuselage 120 adjacent the tail 140. A pair of wings 150 attach to the fuselage 120. A low RCS pedestal or pylon 160 elevates the drone 110 from the ground plane 165 and enables the drone 110 to be turned on the Z axis along the 170 rotational directions.

A test radar 180 emits electromagnetic signals to the drone 110 and receives reflected signals therefrom. A control transmitter 190 controls orientation of the drone 110 can be controlled in relation to the pylon 160. By recording the drone's reflected signals for various programed filter settings at select pedestal orientations, the drone's radar cross-section can be calibrated across its view profiles. Note that the radar 180 can be disposed as a ground station or aboard a mobile platform, such as a ship.

Figure 2:
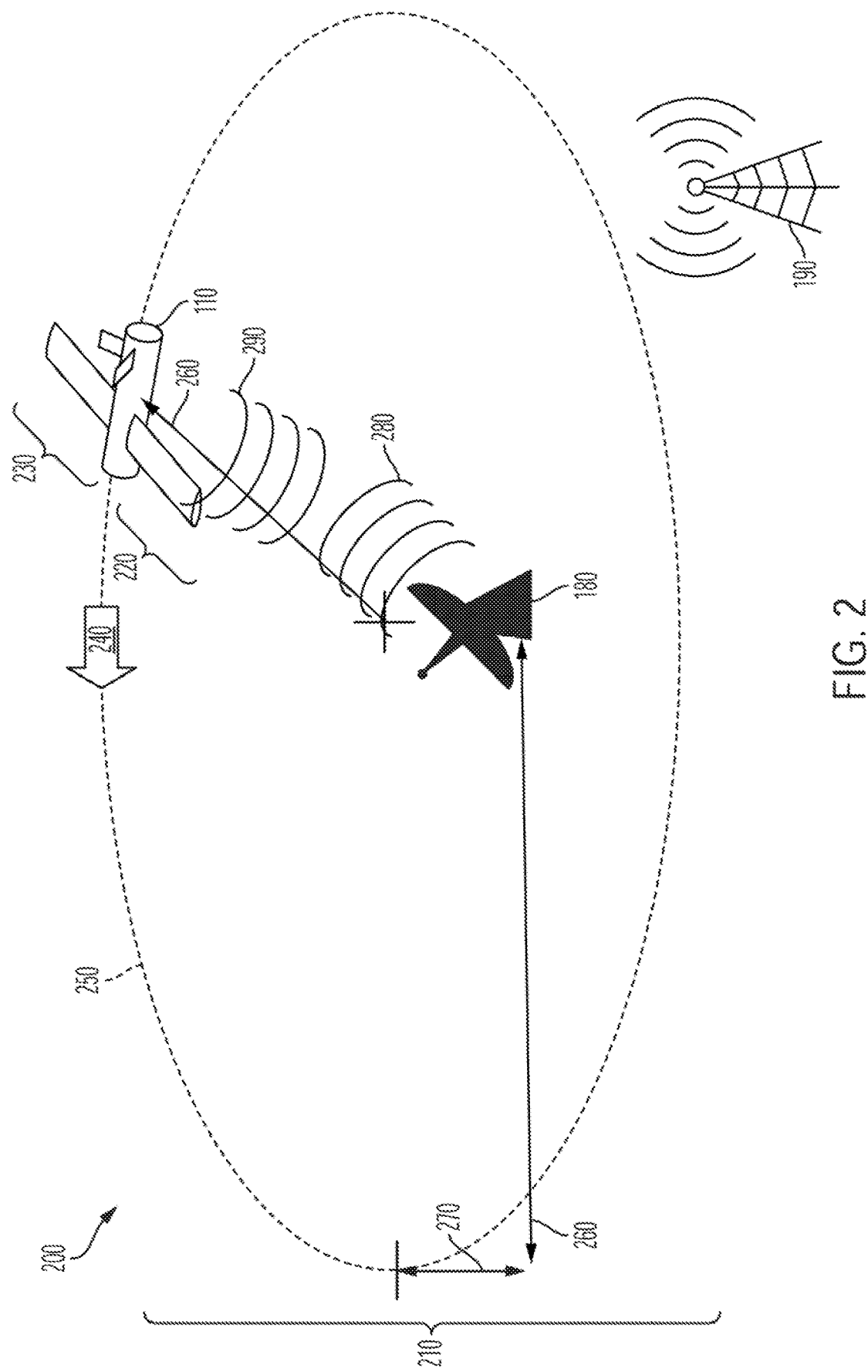
FIG. 2 is a perspective view of the drone in flight.

FIG. 2 shows a perspective view 200 of the aerial drone 110 in flight in a radar test environment as a radar-under-test (RUT) 210. Port and starboard sides 220 and 230 are identified for the drone 110 controlled by the transmitter 190. The drone 110 travels in an anti-clockwise direction 240 defined by an arc path 250 around the radar 180 separated by radius 260 at an elevation 270. The radar transmits signals 280 and receives reflected signals 290 from the drone 110, showing in this illustration its port side 220. In the anti-clockwise direction 240, the drone 110 presents its port profile towards the path's radial center. Alternatively, the drone 110 can travel in a clockwise direction along the arc path 250 so as to present its starboard profile towards the path's center.

Figure 3:
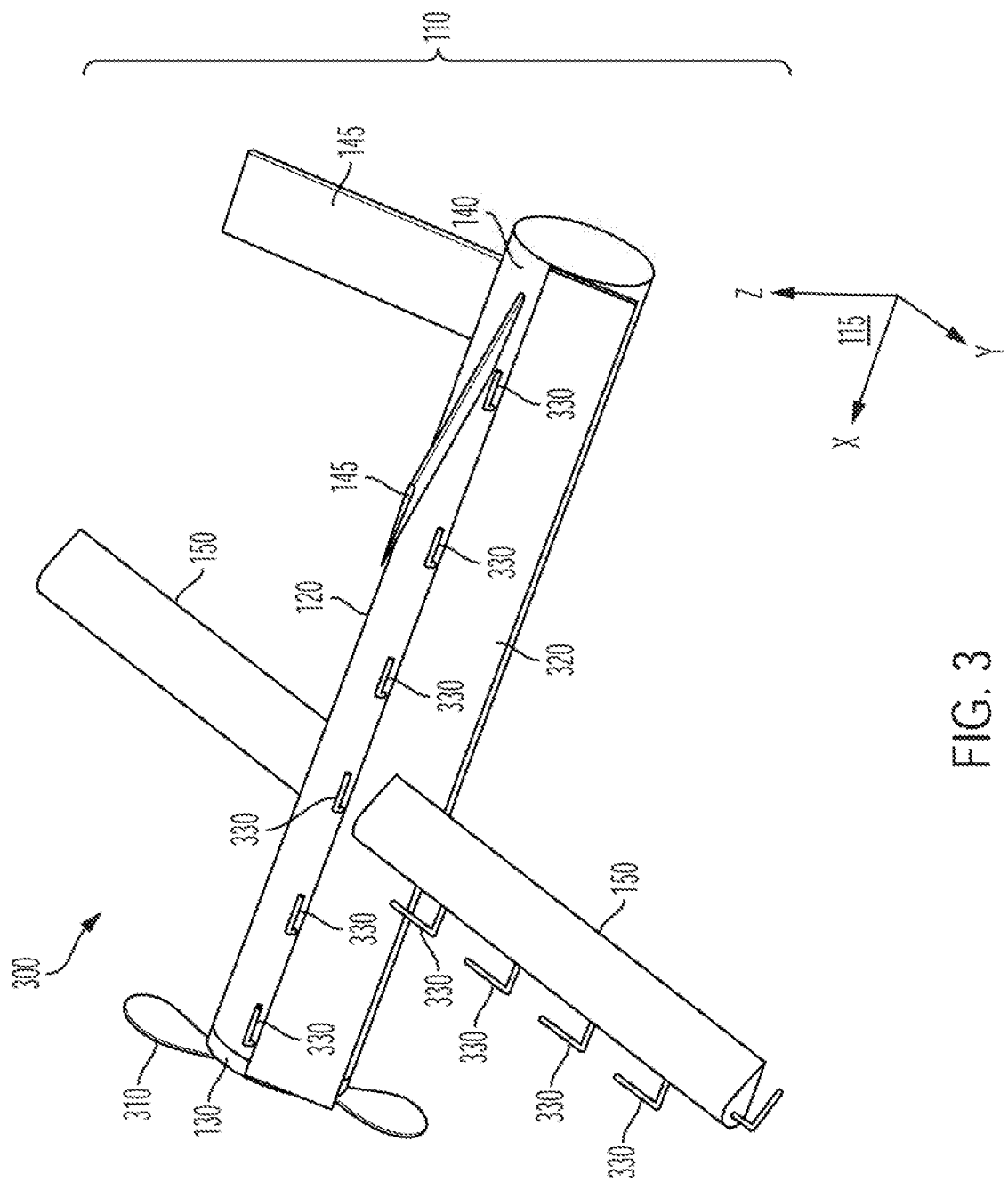
FIG. 3 is a perspective view of the aerial drone.

FIG. 3 shows a perspective view 300 of the exemplary aerial drone 110 in greater detail, with bilateral longitudinal distinction in radar cross-section (RCS). A propeller 310 at the nose 130 denotes an example propulsion mechanism for the drone 110. An energy absorbent panel 320 disposed on the port side 220 either absorbs or cancels radar energy from the transmitted signals 280 to minimize RCS. As an alternative, a similar panel can be used to reflect radar energy with minimal absorption to enhance RCS. Passive corner reflectors or blade antennas 330 can be disposed along either wing 150 and/or along the fuselage 120 at either port or starboard sides 220 and 230. The antennas 330 and related radar-altering components can be removably attached to the fuselage 120 on either the port 220 or starboard 230 sides as needed.

Figure 4:
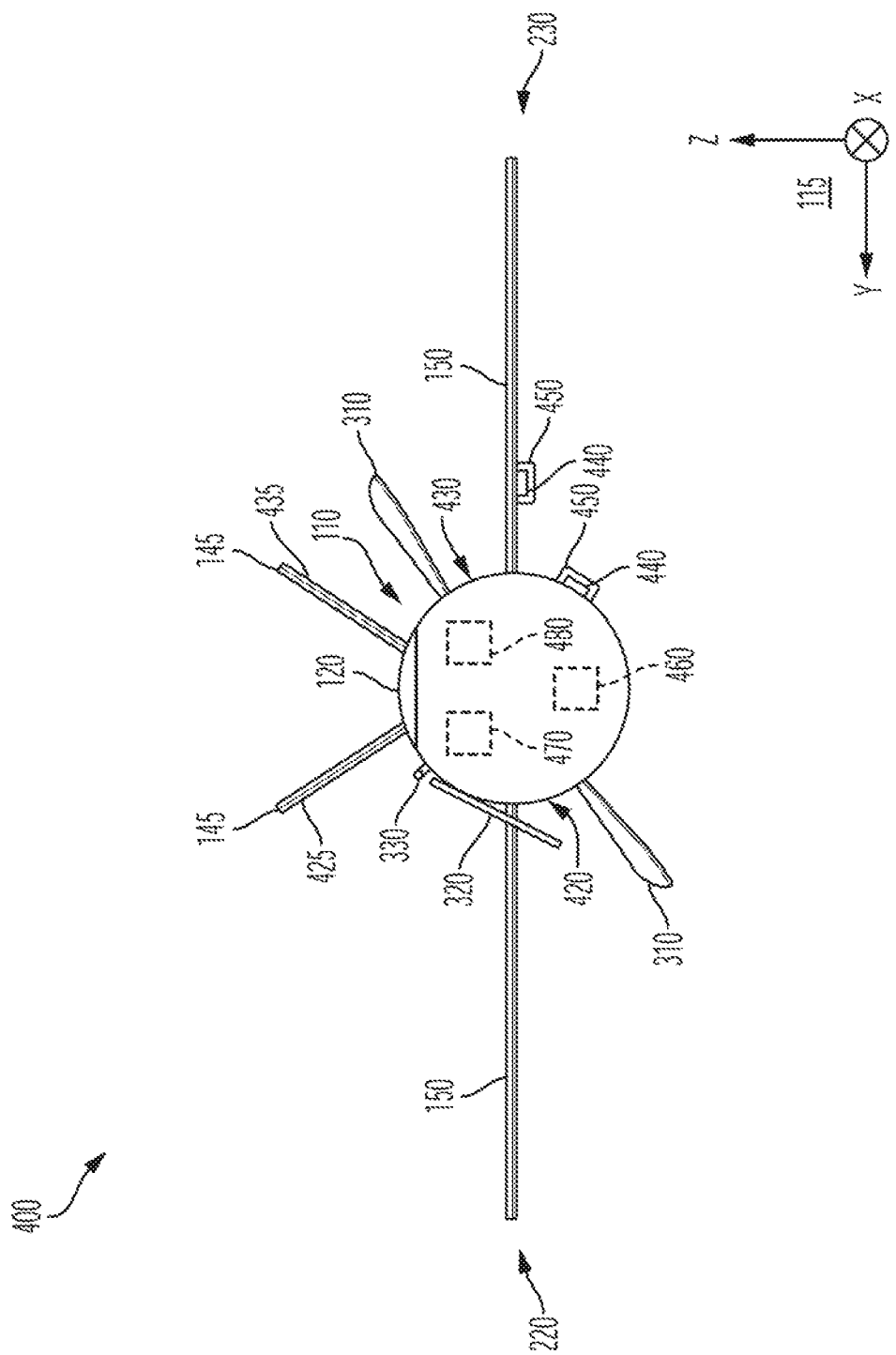
FIG. 4 is a rear elevation view of the aerial drone.

FIG. 4 shows a rear elevation view 400 of the aerial drone 110 looking forward as indicated by the compass rose 115. The port side 220 of the fuselage 120 features a first surface 420 while the port elevator 145 features a lower first face 425. The starboard side 230 of the fuselage 120 features a second surface 430 while the starboard elevator 145 features a lower second face 435. The exterior of the fuselage 120 has mounted thereto several corner reflectors 440 coupled to corresponding shutter 450. Inside the fuselage 120 are installed a radar adapter 460, a GPS receiver 470 and an inertial navigator 480.

Figure 5:
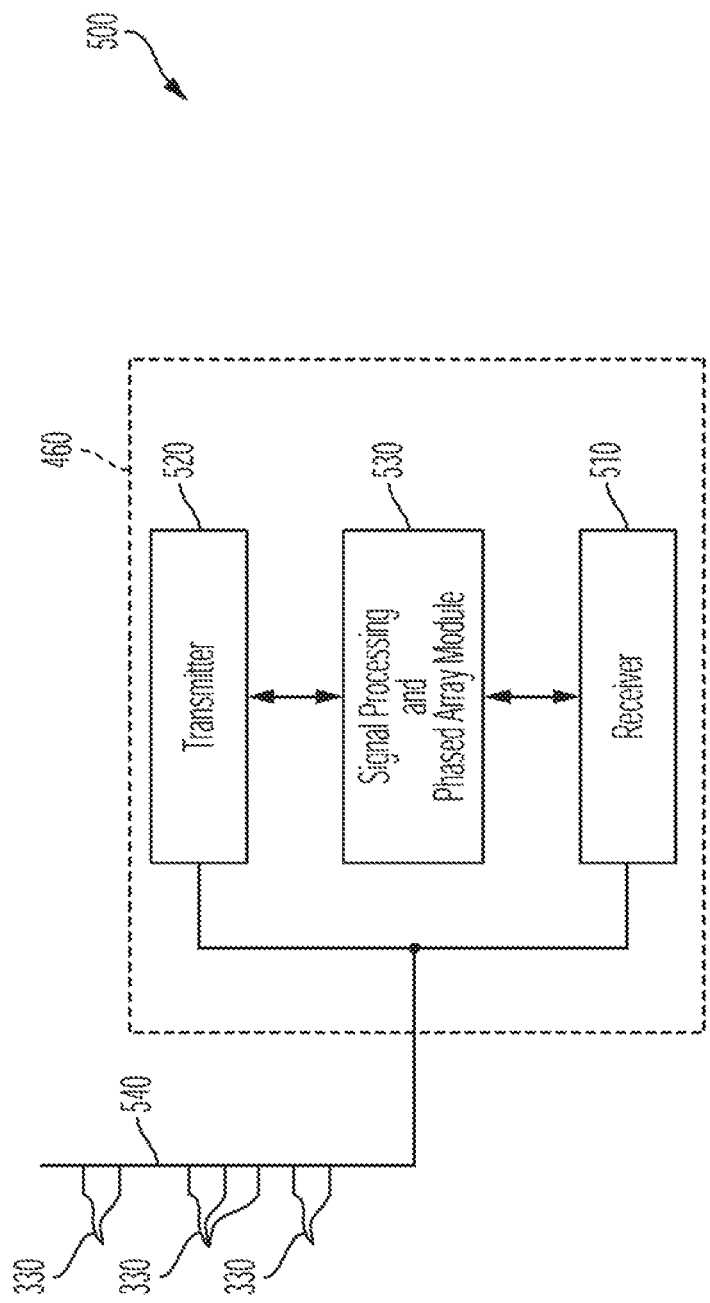
FIG. 5 is a diagram view of a signal emitter aboard the drone.

FIG. 5 shows a diagram view 500 of an EM emitter or adapter 460 aboard the aerial drone 110. The adapter 460 can either cancel or enhance the scattered EM field created when the drone 110 reflects EM signals 290 from the radar 180. The adapter 460 includes a receiver 510, a transmitter 520 and a module 530 for phased array signal processing. The adapter 460 connects via a harness 540 to the blade antennas 330.

Figure 6:
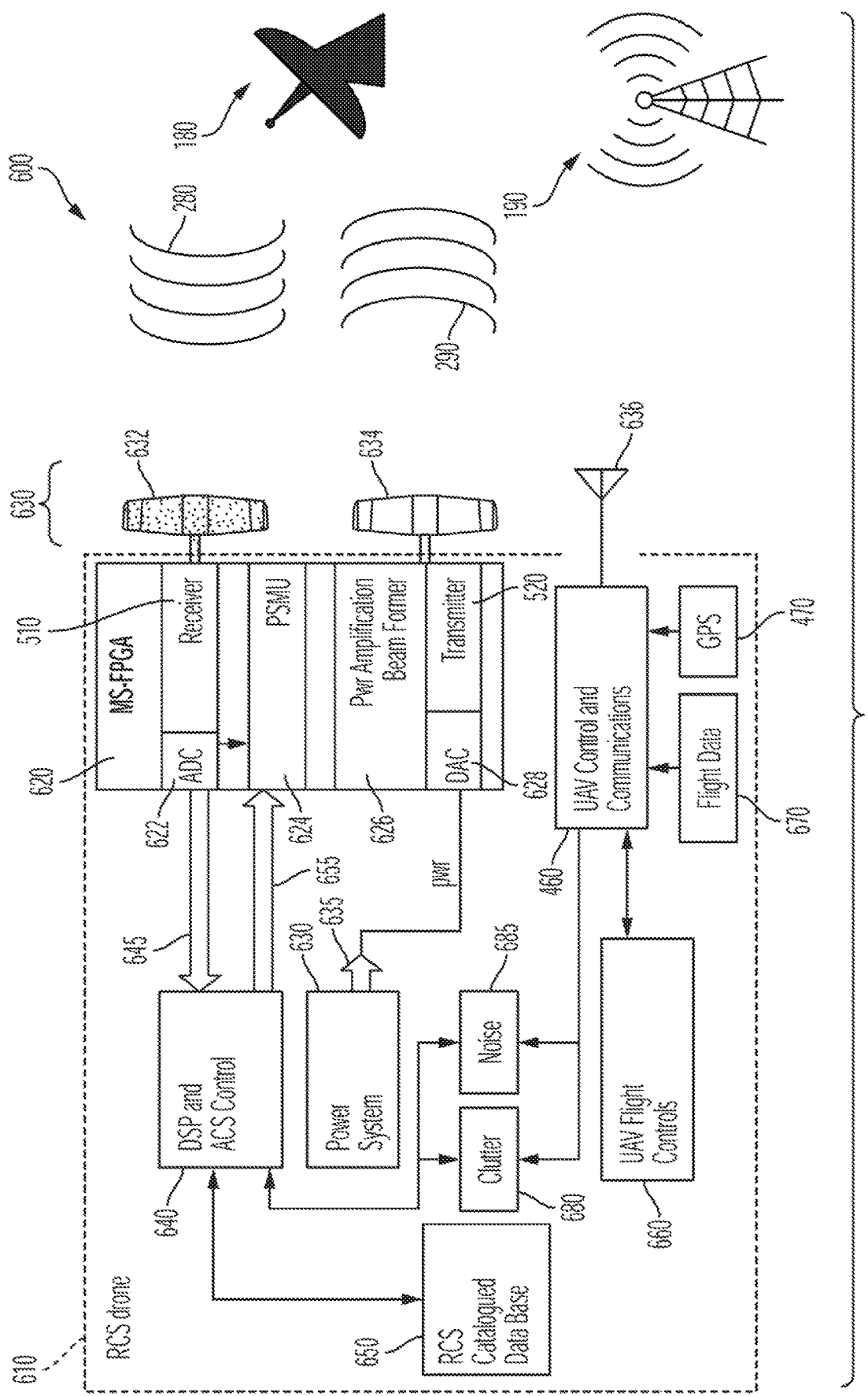
FIG. 6 is a diagram view of a signal adapter.

FIG. 6 shows a diagram view 600 of the drone's radar cross-section (RCS) processor 610, which includes a mixed signal field programmable gate array (MS-FPGA) 620 for signal cancellation. The MS-FPGA 620 includes the signal receiver 510 with an analog-to-digital converter (ADC) 622, which feeds a phase shift modulation unit (PSMU) 624. The MS-FPGA 620 also features a power amplification beam former 626, a digital-to-analog converter (DAC) 628 and the signal transmitter 520. The processor 610 connects a set of antennas 630. In particular, the signal receiver 510 connects to a receiver dipole blade antenna 632, the signal transmitter 520 connects to a transmitter dipole blade antenna 634, and the adapter 460 connects to a drone control antenna 636. A power system 630 provides electrical power 635 to the DAC 628.

A digital signal processor (DSP) controller 640 receives reception information 645 from the ADC 622, and communicates with an RCS catalog database 650. The controller 640 also sends transmission information 655 from the database 650 to the PSMU 624. A flight controller 660 exchanges information with the adapter 460, which also receives information from the GPS receiver 470 and flight data 670, as well as clutter 680 and noise 685 for controlling the drone 110 via its control antenna 636.

Figure 7:
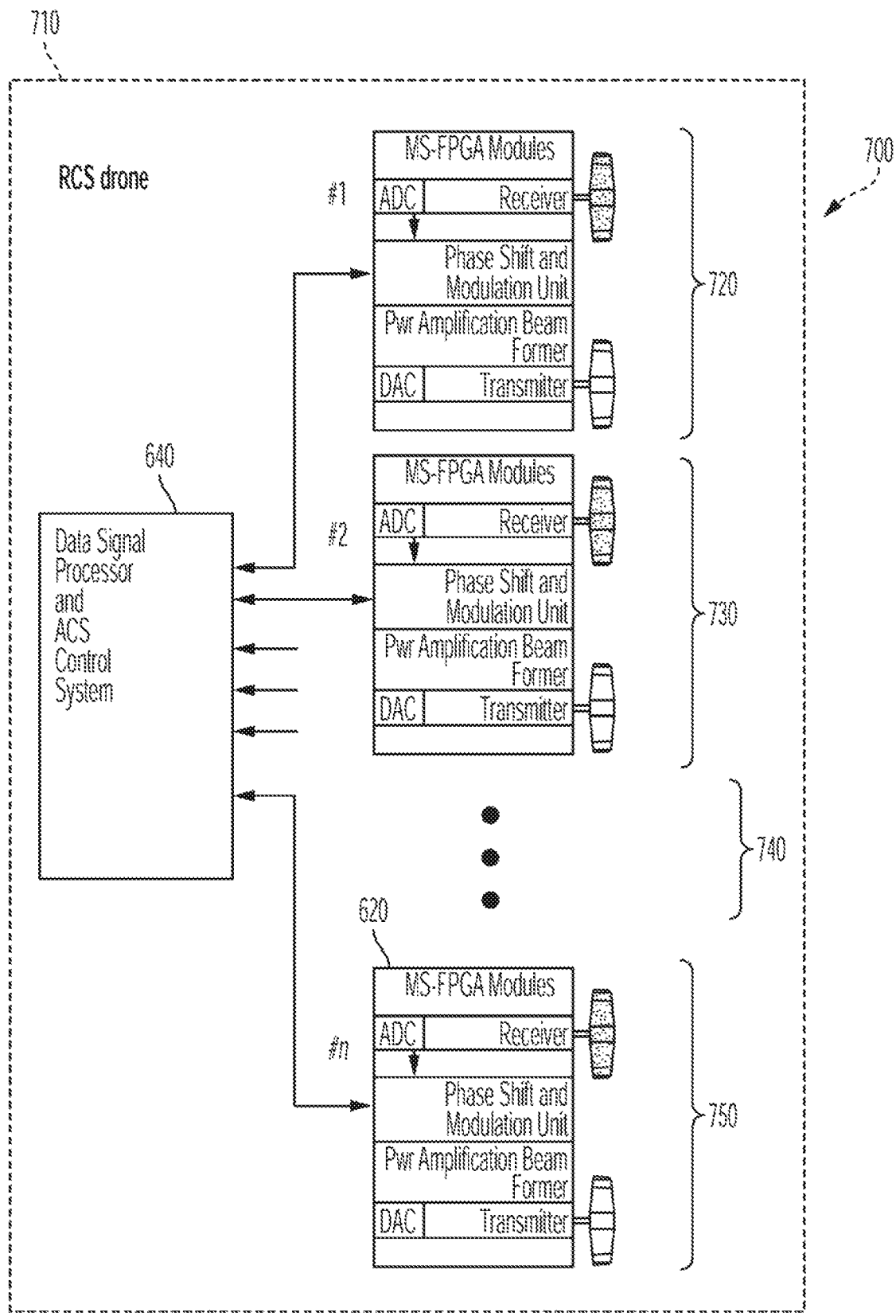
FIG. 7 is a diagram view of the signal adapter.

FIG. 7 shows a diagram view 700 of a multi-cancelling RCS processor 710 featuring a plurality of MS-FPGA 620 units as first 720, second 730 and so forth 740 until reaching the $n^{th}$ 750, all communicating with the DSP controller 640. The multitude of MS-FPGA 620 units, each at separate radar bands, enables the RUT 210 to transmit a variety of frequency bands during a single sortie of the drone 110 in flight with separate MS-FPGA 620 units cancelling their respective designated bands.

Figure 8:
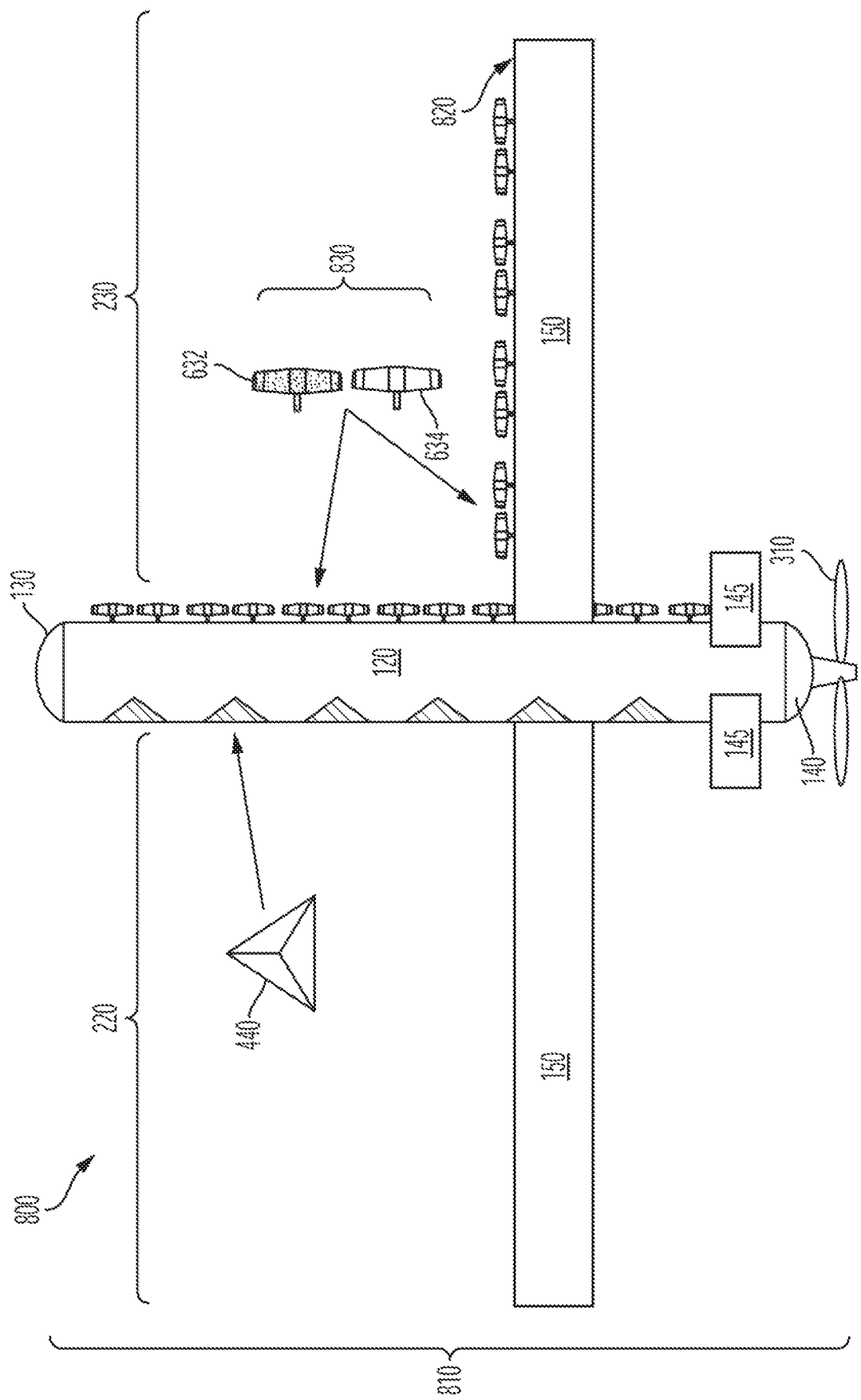
FIG. 8 is a plan view of the aerial drone.

FIG. 8 shows a plan view 800 an exemplary drone 810 featuring the propeller 310 and accompanying engine at the tail 140 rather than the nose 130 with port and starboard sides 220 and 230 identified. Along the fuselage port surface 420 are disposed passive RCS corner reflectors 440. Along the fuselage starboard surface 430 and the starboard leading edge 820 of the wing 150 on the starboard side 230 are disposed complementary pairs 830 of dipole blade antennas, each pair 830 including the receive 632 and the transmit 634 antennas featured in adjacent pairs. The reflectors 440 constitute angular trapezoid shapes to enhance reflective radar signals 290. These reflectors 440 and antenna pairs 830 can be distributed along the fuselage 120 and along one or both wings 150 or elevators 145.

Figure 9:
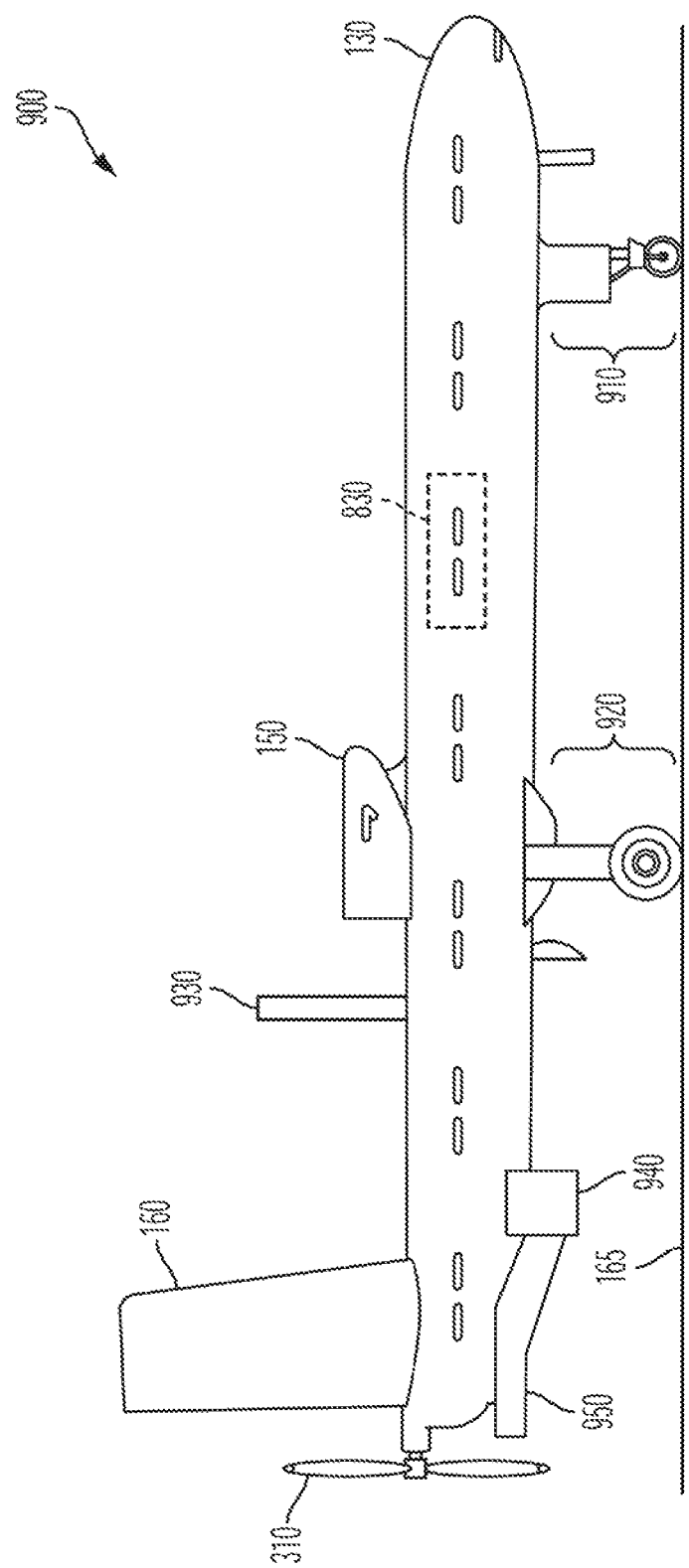
FIG. 9 is an elevation view of the aerial drone.

FIG. 9 shows an elevation view 900 the exemplary drone 810 with rear propeller 310 on the ground plane 165 with fore and mid landing gears 910 and 920 deployed. The antenna pairs 830 are shown, along with protrusions 930, 940 and 950 that house GPS and communications antennas 636. The antenna pairs 830 form a distributed antenna array enabling the drone 110 to determine the EM wave's direction of arrival of the and to steer an enhancing or nulling return signal 290 toward the RUT 210. The scattering and propagation in other directions are not controlled.

Exemplary embodiments described herein are directed to an aerial drone 110 or an unmanned aerial vehicle (UAV)

configured for calibrating or testing a land-based or shipborne radar system. As used herein, the term "unmanned aerial vehicle" shall encompass any UAV, drone or unmanned aircraft powered by any means, e.g., propellers, jet engines, rockets, etc. and any UAVs, drones or unmanned aircraft that are not powered but instead are configured to simply glide once disengaged from a mother aircraft. As used herein, the terms "reflected radar signals", "echo" and "scattered field" all refer to the electromagnet (EM) radiation field produced when the UAV reflects impinging or incident radar signals.

Views 100 and 200 show a UAV or drone 110 in accordance with an exemplary embodiment of the invention. The exemplary drone 110 includes an airframe fuselage 120 with a nose section 130, tail 140 and wings 150. The propeller 310 can be connected to an engine or motor, either installed at the nose 130 or the tail 140, and symbolically illustrates an exemplary powered propulsion mechanism of the drone 110, while precluding alternative propulsion mechanisms. The tail 140 may have a V-tail configuration of elevators 145, as shown in views 100 and 200. The elevators 145 have lower-faces 325 and 335.

The drone 110 in view 400 has port side 220, which exhibits a small radar cross-section (RCS) and an opposite starboard side 230, which exhibits a natural and comparatively larger radar cross-section. The port side 220 is generally defined by port wing 150, port fuselage surface 420, elevator face 425 and the port panel 320. The starboard side 230 is generally defined by starboard wing 150, port fuselage surface 430 and elevator face 435. For the anticlockwise path 250 around the radar 180 that is being calibrated, the port side 220 receives the incident radar signals 280. The port side 220 surfaces include features to avoid sharp angles to minimize scattered energy to exhibit a minimal radar cross-section. By contrast, the starboard side 230 surfaces can include reflectors 440 to augment scattered energy to exhibit a large radar cross-section. The drone 110 can display its starboard side 230 flying clockwise around the radar 180.

In one embodiment, port surfaces 420 and 425, along with port wing 150 can be coated, covered or treated with a suitable radar-absorbing material that further reduces the radar cross-section of port side 220. Radar-absorbing materials are well known in the art. Some examples of radar-absorbing materials are Iron Ball Paint, Foam Absorbers and Jaumann Absorbers. In some embodiments, propeller 310 is non-metallic or alternatively is treated, coated or clad with a radar-absorbing material. Similarly, starboard surfaces 430 and 435, along with the starboard wing 150 remain untreated so as to be absent of any radar-absorbing material.

In some embodiments, at least one passive corner reflector 440 is used on the drone 110 to passively enhance the radar cross-section of the drone 110. In an exemplary embodiment, each passive corner reflector 440 is a retro-reflector having three mutually perpendicular, intersecting flat metal surfaces that reflect radar waves directly back towards the source of radar waves, but in translated form. Typically, the three intersecting surfaces often have equal triangular shapes with normal intersections. In an exemplary embodiment, the three equal square shaped conducting metal surfaces are welded 90° with respect to each other.

Typically, each passive corner reflector 440 is larger than the wavelength of the reflected radar signals. For example, X-band wavelengths are between about 2.5 cm and 3.75 cm. Therefore, in such a scenario, passive corner reflectors 440 will have a size that is between twenty five and thirty eight centimeters. At X-band wavelengths, the RCS of a twenty-centimeter reflector is already about a hundred square meters, In an exemplary embodiment, at least one passive corner reflector 440 is removably attached to the starboard surface 430 of the airframe fuselage 120 in order to passively enhance the radar cross-section of the starboard side 230. In other embodiments, more than one passive corner reflectors 440 is removably attached to starboard surface 430 of the airframe fuselage 120. Any number of passive corner reflectors 440 may be mounted at any location on the drone 110, as they operate independently of each other but have the accumulative effect of enhancing the radar cross-section of the drone 110. There is no specific or required distance between passive corner reflectors 440. In some embodiments, at least one passive corner reflector 440 is also attached to the starboard wing 150 so as to further passively enhance the radar cross-section.

In some embodiments, shutters 450 are used with passive corner reflectors 440. In such embodiments, each shutter 450 is also attached to airframe fuselage 120 and/or starboard wing 150 and positioned in front of a corresponding passive corner reflector 440. Each shutter 450 is configurable to an open position and a closed position. For the shutter 450 being in the open position, the corresponding passive corner reflector 440 is exposed to the radar signals 280 impinging upon the drone 110 and consequently reflects radar signals 290. For the shutter 450 being in the closed position, the corresponding passive corner reflector 440 is obscured from the impinging radar signals 280 and therefore does not reflect radar signals 290 and does not contribute to the radar cross-section of the starboard side 230 of the drone 110. Shutters 450 may be controlled electronically by electronic control circuitry on board the drone 110 or may be manually set to the open or closed position prior to the flight of the drone 110.

Referring to views 100 and 200, the drone 110 includes a plurality of blade antennas 330 attached to fuselage 120. Blade antennas 330 may be mounted anywhere on the drone 110. In an exemplary embodiment, blade antennas 330 are attached to airframe fuselage 120. In another exemplary embodiment, blade antennas 330 are also attached to wings 150. In a further exemplary embodiment, blade antennas 330 are mounted on starboard surface 430 of airframe fuselage 120. In an exemplary embodiment, each antenna 330 is configured as a blade antenna.

Typically, blade antennas 330 are trapezoidal in shape. However, in some embodiments, the trapezoidal shape may be varied for aerodynamic purposes. Additionally, other physical alterations (e.g., notches) may be made to the blade antenna to achieve improved broad band performance. There is no specific or required distance between blade antennas 330. In an exemplary embodiment, the blade antennas 330 are equidistantly spaced apart to form an antenna array that has directivity toward the radar system being calibrated.

Because of the frequency dependence of the dimensions of each blade antenna 330, each antenna 330 may be sized to maximize its performance in the X-Band (acquisition search) and S-Band (volume search). Example frequency bands would be 20 GHz to 30 GHz. In other embodiments, each antenna 330 is configured as a blade antenna. Blade antennas 330 operate at or near the natural resonant frequency of the drone 110.

The drone 110 further includes adapter 460 coupled to blade antennas 330 and which is configured to either cancel the scattered field of the drone 110, or enhance the scattered field of the drone 110, depending upon the mode of operation of adapter 460. Specifically, in a first mode of operation, adapter 460 receives incident radar signals from blade antennas 330, processes the incident radar signals 280 to extract particular signal information, generates a cancellation signal that has a phase that is opposite to the phase of the echo or scattered field of the drone 110 and then transmits this cancellation signal through blade antennas 330 as an EM field that in the direction of the RUT 210 is equal to the drone's scattered field, but with opposite phase. Because the EM field has a phase that is opposite to the phase of the scattered field of the drone 110, the scattered field is cancelled thereby significantly reducing the overall radar cross-section of the drone 110. In a second mode of operation, adapter 460 receives incident radar signals from blade antennas 330, processes the incident radar signals and extracts the particular signal information in the same manner as done in the first mode of operation.

Next, adapter 460 generates a signal waveform that is in-phase with the phase of the scattered field of the drone 110 and then transmits this signal in the direction of the RUT 210 through blade antennas 170 as an EM field that is equal to the drone's scattered field with the same phase. Because the EM field is in-phase with the phase of the scattered field, the generated EM field combines with the scattered field of the drone 110 thereby amplifying the scattered field and enhancing the overall radar cross-section of the drone 110. In a third mode of operation, communication module 260 does not transmit any EM field. During this third mode of operation, shutter devices 450 may be configured to the open position so as to provide passive enhancement of the radar cross-section of the starboard side 230 of the drone 110. In one embodiment, the shutter devices 450 are electronically controlled by control signals provided by adapter 460.

Referring view 400, in an exemplary embodiment, communication module 260 includes receiver 510, transmitter 520, signal processing and phased-array module 530 and dipole connector 550. The radar signals incident upon the drone 110 are detected by blade antennas 330 and then coupled to the receiver 510, which measures frequency, phase, amplitude and angle of arrival of the incident radar wave, and the radar waveform's characteristics, polarization and space position. The receiver 510 outputs these measured data for input into signal processing and phased-array module 530, which may include one or more signal processors, a field-programmable-gate-array (FPGA), digital radiofrequency memory (DRFM) and phased-array components, all of which cooperate to generate required signal waveforms for the receiver 510. In the first mode of operation, the signal waveform generated by the module 530 is about 180° out of phase, in the direction of the RUT 210, with the scattered field of the drone 110. The signal waveform is then fed to the receiver 510 which then transmits electromagnetic (EM) waveforms over blade antennas 330, which cancel the scattered field of the drone 110.

In the second mode of operation, the signal waveform generated by module 530 is in-phase with the scattered field of the drone 110 in the direction of the RUT 210. The signal waveform is then fed to receiver 510 which then transmits electromagnetic (EM) waveforms over blade antennas 330 which combine with the scattered field of the drone 110 thereby amplifying the scattered field of the drone 110 and increasing the radar cross-section of the drone 110. The adapter 460 can be programmed to implement the first mode of operation or the second mode of operation based on a selection signal from the control transmitter 190 to indicate the desired operation mode.

Active systems to increase or decrease a target's radar cross-section by enhancing or cancelling, respectively, the target's echo or scattered field are known in the art. The principles and concepts behind such systems are described in published technical articles by I. A. Osman, A. A. J. Alzebaidi, "Active Cancellation System For Radar Cross Section Reduction", *International Journal of Education and Research*, 1 (7), July 2013; Xu Sheng and Xu Yuanming, "Assemble An Active Cancellation Stealth System", *Defense Electronics*, http://www.defenseelectronicsmag.com/systems-amp-subsystems/assembleactive-cancellation-stealth-system, Jul. 10, 2012; and J. M. Franck, R. P. Barnes, T. J. Keller, T. Kaufmann and S. Han, "Active Cancellation-A means to zero dead-time pulse EPR", *Journal of Magnetic Resonance*, 261, pp. 199-204, December 2015. Active cancellation is also discussed by Qu Changwen and Xiang, "Active Cancellation Stealth Analysis Based on RCS Characteristics of Target", *Radar Science and Technology*, 4, 2010, pp. 109-112, 118.

Referring to view 200, in an exemplary embodiment, the drone 110 includes a global positioning system (GPS) receiver 470 and inertial navigator 480, both of which being shown in phantom. Inertial navigator 480 is in electronic signal communication with GPS receiver 470 and includes a recorder. The GPS receiver 470 and inertial navigator 480 maintain the flight path and course of the drone 110 when the drone 110 is flying patterns around a radar system that is to be tested or calibrated. The inertial navigator 480 can be programmed with a predetermined flight path or course. The inertial navigator 480 includes communication circuitry for receiving control signals transmitted by ground control. The GPS receiver 470 and inertial navigator 480 are well known in the art and are therefore not described in detail herein.

The radar cross-section of the drone 110 was measured and recorded for all radar angles of incidence in order to develop a library of reference data that may be used during actual calibration of radar systems. In order to accomplish this, the drone 110 has been rotatably mounted atop the low RCS pylon 160 or pedestal so that the drone 110 could rotate 360° relative to the ground plane 165.

The pylon 160 was configured to have a very low radar cross-section. The pylon 160 extended upward over the projected ground plane 165 for a predetermined height. Such a pylon 160 is used at the RADSCAT Advanced Measurement Systems (RAMS) at the White Sands Missile Range in New Mexico which can extend over fifty feet above the projected ground plane. The drone 110 and pylon 160 were configured to enable the drone 110 being rotated 360°. The drone 110 was initially positioned such that nose 130 was positioned at the twelve o'clock position and tail 140 was at the six o'clock position. The drone 110 was then rotated 170 clockwise for 180°. Because the starboard side 230 of the drone 110 was not configured to have a small RCS, the measured radar cross-section of the drone 110 from 0° to 180° constituted a regular RCS measurement. When passive corner reflectors 440 were configured so as to contribute to the drone's scattered field, the measured radar cross-section of the drone 110 from 0° to 180° was larger than the regular RCS measurement.

Thus, the radar cross-section of the drone 110 from 0° to 180° was passively enhanced by passive corner reflectors 440, The passive corner reflectors 440 were removed or unplugged from the fuselage 120. Next, the drone 110 was activated in the second mode of operation so as to generate an EM radiation field that was in-phase with the drone's scattered field thereby actively enhancing the radar cross-section of the drone 110 from 0° to 180°. As the drone 110 rotated 170 from 180° to 360°, its measured RCS of the drone 110 was relatively low because port side 220 of the drone 110 was then exposed to the radar signals 280 emanating from the radar 180 being calibrated. Next, the adaptor 460 was activated in the first mode of operation to generate an EM radiation field that, directed towards the RUT 210, cancelled the drone's scattered field such that its measured RCS towards the RUT 210 became very low.

The measured data obtained during Active Cancellation Calibration Test at the radar range while rotating the drone 110 through 360° were digitized and stored in memory or other data storage device in order to form a reference look-up table to be used during the calibration and performance verification test of an RUT 210. During actual radar calibration/performance tests, the GPS receiver 470 and inertial navigator 480 controls the drone 110 to fly in accordance with a predetermined flight path 250 around or across the front of a radar 180 as the RUT 210 that is being calibrated or tested. In order to present a low radar cross-section to the RUT 210, the drone 110 is flown counter-clockwise around or in front of the RUT 210 so that only port side 220 of the drone 110 is exposed to the EM radiation produced by the RUT 210. During this part of the test, the adaptor 460 is not activated. In the next step of the test procedure, the adaptor 460 is activated in the first mode of operation and generates an EM field that cancels the scattered field of the drone 110 thereby providing a very low cross-section to the RUT 210.

The next phase of the test included presenting a regular RCS of the drone to the RUT 210. Therefore, the GPS receiver 470 and inertial navigator 480 control the drone 110 to fly in accordance with a clockwise flight path around or across the front of the RUT 210 so that only starboard side 230 of the drone 110 is exposed to the EM radiation produced by the RUT 210. This results in a normal or natural radar cross-section being presented to the RUT 210. Next, the adaptor 460 is activated in the second mode of operation to generate an EM radiation field that is in-phase with the drone's scattered field.

Consequently, the drone's scattered field is amplified and the drone's radar cross-section presented to the RUT 210 becomes greatly enhanced. The next step in the test is to passively enhance the drone's RCS presented to the RUT 210. In this step, the adaptor 460 is shifted to the third mode of operation and is not used. Instead, shutters 450 are configured to the open position so that passive corner reflectors 440 contribute to the drone's scattered field. This results in passive enhancement of the drone's RCS that is presented to the RUT 210.

In other embodiments, shutters 450 are not used on the drone 110 and the passive corner reflectors 440 are of the plug-in type and are removably attached to fuselage 120. In order to passively enhance the radar cross-section with these plug-in type passive corner reflectors 440, the drone 110 would first land so that ground personnel could plug in the passive corner reflectors 440 to the corresponding slots or sockets in the fuselage 120. Thus, exemplary embodiments provide a multi-function UAV or drone 110 that enables efficient and accurate calibration and testing of land-based and shipborne radar systems that solves the problems associated with conventional techniques for calibrating and testing such radar systems.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize exemplary embodiments with various modifications as are suited to the particular use contemplated.

Finally, any numerical parameters set forth in the specification and attached claims are approximations (for example, by using the terms "about" or "around") that may vary depending upon the desired properties sough to be obtained by the present invention. At the very least, and not as an attempt to limit the application of the doctrine of equivalents to the scope of the claims, each numerical parameter should at least be construed in light of the number of significant digits and by applying ordinary rounding.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An aerial drone for radar cross-section (RCS) signal response calibration of a radar that transmits an emission signal, said drone reflecting a return signal dependent on an RCS and comprising:
   an airframe fuselage with port and starboard profiles along a longitudinal axis;
   port and starboard wings disposed laterally to said longitudinal axis corresponding to said respective profiles;
   a corner reflector on said fuselage along one of said port and starboard profiles for amplifying the return signal to increase the RCS; and
   an energy absorber on said fuselage along the other of said port and starboard profiles for attenuating the return signal to decrease the RCS.

2. The drone according to claim 1, wherein said corner reflector denotes a plurality of corner reflectors disposed along said fuselage, and said energy absorber denotes a plurality of energy absorbers disposed along said fuselage.

3. The drone according to claim 1, further comprising a blade antenna to receive the emission signal from the radar and transmit the return signal.

4. The drone according to claim 3, wherein said blade antenna is a plurality of blade antennas longitudinally disposed along said fuselage.

5. The drone according to claim 1, wherein said fuselage includes opposing bilateral first and second surfaces along said longitudinal axis, said first surface exhibiting a first RCS profile and said second surface exhibiting a second RCS profile that is relatively larger than said first RCS profile.

6. The drone according to claim 5, wherein said first surface incorporates a radar absorbing material that reduces the RCS.

7. The drone according to claim 5, further including a passive corner reflector disposed on said second surface that increases the RCS.

8. The drone according to claim 7, further including a shutter positioned adjacent to said passive corner reflector, said shutter being configurable to open and closed positions, wherein the emission signal is
   reflected by said passive corner reflector so to enhance the RCS on said second side for said shutter being in said open position, and
   obscured from said passive corner reflector for said shutter being in said closed position.

9. The drone according to claim 1, further including:
a flight controller for directing the drone;
a GPS receiver for instructing said flight control; and
an inertial navigation system in electronic signal communication with said GPS receiver.

10. The drone according to claim 9, wherein said flight controller flies the drone around the radar in an anti-clockwise path to present said port profile.

11. The drone according to claim 9, wherein said flight controller flies the drone around the radar in a clockwise path to present said starboard profile.

* * * * *